United States Patent [19]

Mann

[11] Patent Number: 4,464,186
[45] Date of Patent: Aug. 7, 1984

[54] PNEUMATIC FILTER AND LIQUID EVAPORATOR

[75] Inventor: David O. Mann, Marshall, Mich.

[73] Assignee: La-Man Corporation, Hamilton, Ind.

[21] Appl. No.: 465,296

[22] Filed: Feb. 9, 1983

[51] Int. Cl.³ ............................................. B01D 53/04
[52] U.S. Cl. .......................................... 55/387; 55/32;
 55/DIG. 17; 210/446
[58] Field of Search ................ 55/29, 32, 33, 35, 387,
 55/486, 487, 492, 500, 501, 503, 520, 528, DIG.
 17; 210/94, 232, 238, 310, 446–448, 451–455,
 497.01

[56] References Cited

U.S. PATENT DOCUMENTS

| 945,632 | 1/1910 | Strahl | 210/446 X |
|---|---|---|---|
| 1,352,961 | 9/1920 | Hills | 210/452 |
| 1,630,480 | 5/1927 | Fesler | 210/453 X |
| 2,065,658 | 12/1936 | Compton | 210/453 X |
| 2,304,492 | 12/1942 | Aue et al. | 210/446 |
| 2,389,814 | 11/1945 | Pond et al. | 210/448 X |
| 2,545,789 | 3/1951 | Miller | 210/447 X |
| 2,556,292 | 6/1951 | Newcum | 210/446 X |
| 2,781,912 | 2/1957 | Newcum | 210/452 X |
| 2,781,913 | 2/1957 | Thompson | 55/492 X |
| 4,116,650 | 9/1978 | Lane | 55/387 |
| 4,177,049 | 12/1979 | Haslett, Jr. | 55/DIG. 17 |
| 4,385,913 | 5/1983 | Lane | 55/DIG. 17 |
| 4,400,187 | 8/1983 | Lane | 55/387 |
| 4,400,277 | 8/1983 | Leason | 210/454 X |

Primary Examiner—Robert H. Spitzer
Attorney, Agent, or Firm—Barnes, Kisselle, Raisch, Choate, Whittemore & Hulbert

[57] ABSTRACT

A pneumatic liquid evaporator and filter comprising a metallic case or housing adapted for connection in a compressed air line and a disposable cartridge assembly removably disposed within the case. The cartridge assembly includes a cylindrical shell having an apertured end wall and a separately formed end cap dimensioned to prevent reverse insertion of the cartridge assembly into the case. A plug of wire and fabric knitted mesh construction is disposed within the shell for performing the vaporization and filtration functions. The end cap includes an apertured bullet-shaped projection which holds the plug against the shell end wall and urges surrounding plug material radially against the shell side wall. An open cavity is thus formed around the projection between the plug and end cap.

12 Claims, 4 Drawing Figures

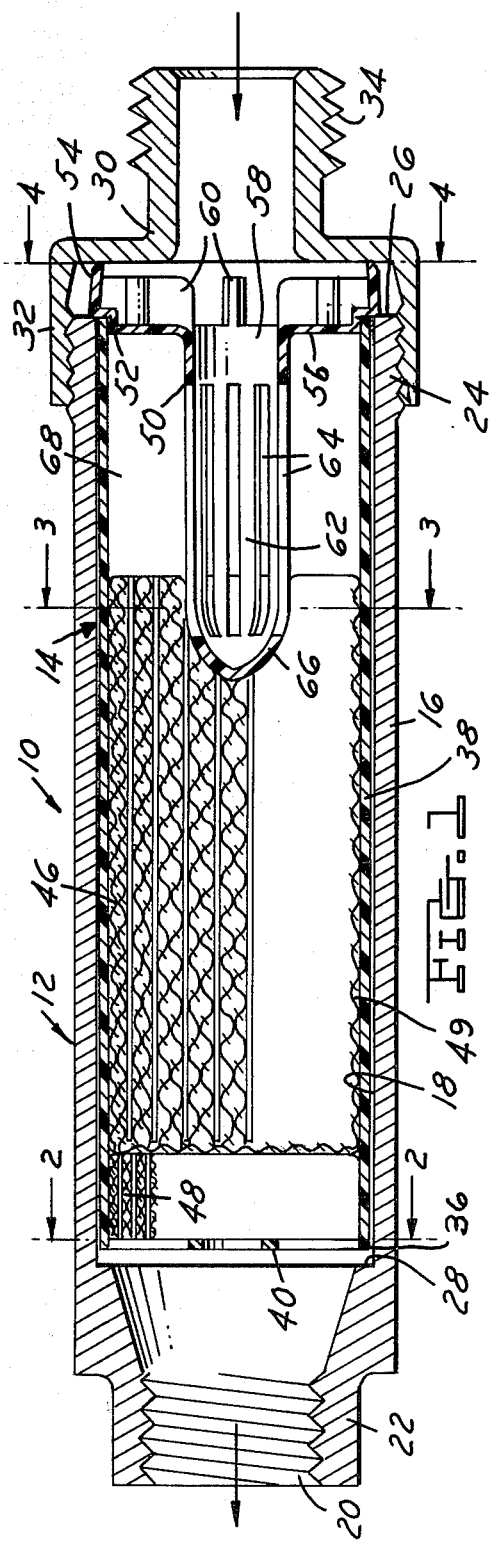
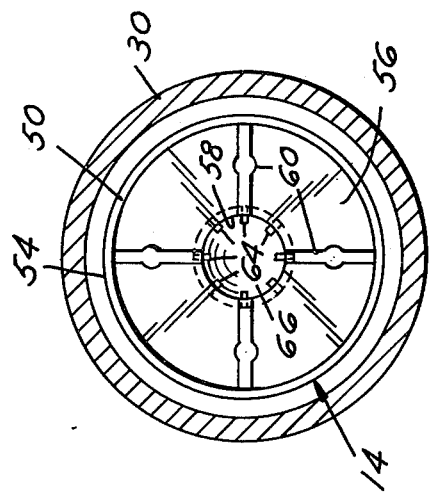
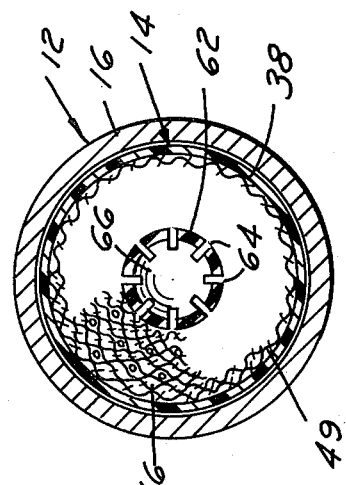
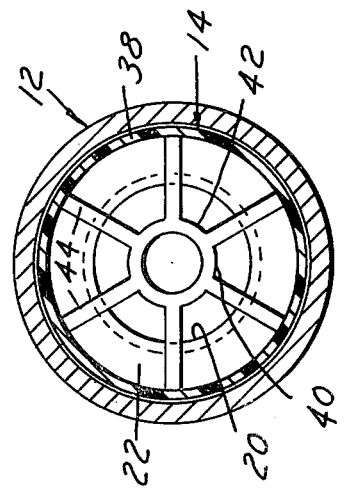

PNEUMATIC FILTER AND LIQUID EVAPORATOR

The present invention is directed to devices for preventing circulation of liquid in compressed air lines, termed pneumatic liquid vaporizers or evaporators. More particularly, the invention is directed to improvements in evaporators of the type shown in U.S. Pat. No. 4,116,650 and in copending application for U.S. Application Ser. No. 338,913 filed Jan. 12, 1982 now Patent No. 4,400,187.

Prior art pneumatic liquid evaporators of the type illustrated in the referenced patent and patent application typically comprise a disposable cartridge of water absorbent material disposed within a metal or plastic case which is adapted for connection in a compressed air line. Water droplets entrained in the compressed air, which may damage pneumatic equipment, are absorbed by the cartridge material and then evaporated as entrained vapor. The disposable cartridge illustrated in the referenced application, which has met with substantial success in the marketplace, includes a spool of two-piece molded plastic construction having cottom gauze and wire mesh spirally wound around the spool between the spool ends. Replacement cartridges have the gauze/mesh portion of the cartridge wrapped in paper for transport and handling, which is intended to be split or removed prior to insertion into an existing case. The spool ends are intended to seal against the case so as to force compressed air through the cartridge material.

A problem has been noted with the described cartridge construction in that tolerance variations in the molded plastic spool pieces often are such that the case cannot be properly closed with a replacement cartridge inserted therein and/or the spool ends do not seal against the case wall as intended. The result may be that the compressed air bypasses the water absorbent material and/or leaks from the improperly closed case. Furthermore, failure by persons in the field to split or remove the wrapping paper in the replacement cartridge, particularly when combined with unfavorable tolerance stackup in the spool subassembly, results in improper operation. Yet another problem with the art is the difficulty in controlling pack density of the spirally-wound water absorbent material, resulting in varying flow rates and efficiencies.

Accordingly, it is an object of the present invention to provide a pneumatic liquid evaporator and filter of the described type which overcomes the aforementioned deficiencies of the prior art.

More specifically, it is an object of the present invention to provide an improved disposable cartridge construction for use in such evaporators which may be simply removed from the shipping container and inserted into the case, and which has a construction such that normal tolerance variations will not affect operability or utility thereof.

Another object of the invention is to provide a replaceable cartridge of the described type which is readily adapted for modification as the manufacturing stage in accordance with different filter capability requirements.

The invention, together with additional objects, features and advaantages thereof, will be best understood from the following description, the appended claims and the accompanying drawings in which:

FIG. 1 is an elevational view of a pneumatic liquid evaporator and filter assembly in accordance with a presently preferred embodiment of the invention sectioned in a plane which includes the assembly axis; and FIGS. 2-4 are sectional views respectively taken along the lines 2—2, 3—3 and 4—4 in FIG. 1.

The drawings illustrate a presently preferred embodiment of a pneumatic liquid vaporizer and filter 10 in accordance with the invention as comprising a housing 12 and a disposable cartridge 14 removably received therein. Housing 12 includes a case 16 having a cylindrical bore 18 which terminates in an internally threaded opening 20 at one end 22 of case 16. The opposing end 24 of case 16 is open to bore 18 and is surrounded by a wall 26 facing axially in a plane perpendicular to the coincident axes of bore 18, case 16 and opening 20. Bore 18 terminates at case end 22 in an axially facing shoulder 28. A cap 30 has a hollow cylindrical base 32 with internal threads adapted to be removably received over external threads formed on case end 24. A hollow externally threaded stem 34 projects from cap base 32. Stem 34 is coaxial in assembly with case 16.

Housing 12, including case 16 and cap 30, is identical to that disclosed in the above-referenced copending application. Stem 34 and opening 20 in case 16 are formed for connection in a compressed air line using suitable nipples (not shown). It is critical that the housing be connected in the air flow path so that compressed air flows therethrough in a given direction, which is to say that either stem 34 or case end 22 is predesignated an inlet opening and the other is predesignated an outlet opening. Housing 12 therefore typically includes indicia, such as a printed label or the like (not shown), specifying the required direction of air flow. In the construction shown, stem 34 is predesignated the inlet opening and opening 20 is predesignated the outlet opening. Preferably, housing 12, including case 16 and cap 30, are of rigid metallic construction, such as brass.

Cartridge 14 in accordance with the invention comprises a cylindrical shell 36 having a relatively thin imperforate side wall 38 and an integral end wall 40. End wall 40 in the preferred construction includes a central ring 42 (FIGS. 1 and 2) coupled to side wall 38 by the radial ribs 44. A circumferential array of arcuate apertures are thus formed between ribs 44 and a central circular aperture is formed within ring 42.

Within shell 36 is disposed a pair of plug sections 46,48 which serve the combined function of vaporizing liquid droplets entrained in compressed air pasing therethrough and filtering any foreign matter. Plug sections 46,48 fill the inside diameter of shell 36 and have a combined axial dimension (where both sections are employed) which is less than the overall length of shell 36. Most preferably, plug sections 46,48 are in slight radial compression in assembly to prevent air passage around the plug. Plug section 46 and/or 48 may be enclosed in a cotton sock 49 or the like to facilitate assembly into shell 36.

In the preferred embodiment of the invention shown in the drawings, plug sections 46,48 are each constructed of so-called knitted mesh of interlocking strands of metal wire and water-absorbent fabric such as cottom. In general, knitted mesh is formed by knitting separate strands into a continuous stocking which is then drawn, wound and/or pressed into desired shape. A ratio of five cottom fibers to one metal strands has been found to perform satisfactorily. Porosity of the final plug is a controllable function of starting wire and strand diameter, and the tightness of compression in the plug forming operation. Plug section 46 may have, for example, a five micron nominal porosity. If the desired application of the filter only calls for particle filtration of this capacity, plug section 48 may be deleted. On the other hand, if customer requirements call for a one micron filter capacity, for example, plug section 48 may be so designated. Knitted mesh products marketed by the Metex Industrial Products Division of Metex Corporation of Edison, N.J. may be employed, for example. For extremely fine filtration, plug section 48 may comprise other media such as microporous plastics or non-oriented felt.

A separately formed end member or cap 50 is received over the open end of shell 36. More specifically, cap 50 has a stepped periphery 52 received within shell wall 38 and from which a conical flange 54 (FIGS. 1 and 4) projects for sealing abutment with the opposing surface of housing cap 30. It will be noted that shoulder 52 extends radially beyond shell wall 38, so that flange 54 is compressed by cap 30 against case end 36. This geometry prevents reverse insertion of cartridge 14 into housing 12. A central flat portion 56 of end cap 50 has a central opening 58 aligned in assembly with stem 34. Strengthening ribs 60 couple flange 50 to central portion 56 for holding flange 54 in position under compression by housing cap 30.

A hollow bullet-shaped projection 62 integrally encircles opening 58 and projects into the cavity formed by shell 36. A circumferential array of axial slots 64 are formed around projection 62. As best seen in FIGS. 1 and 3, projection 62 is of generally cylindrical geometry throughout a major portion of its length and has a closed end 66 which tapers narrowingly away from opening 58. Preferably, the tapered end 66 of projection 62 engages and is embedded within plug section 46. This serves two important functions. Firstly, projection 62 holds plug section 46 (and plug section 48) against shell end wall 40 so as to form an open cavity 68 within shell 16 adjacent to end cap 50. Secondly, embedment of projection end 66, particularly combined with the axially tapering cross section thereof, urges the surrounding plug material radially against shell wall 38 so as to prevent flow of air around the plug material. It will be noted that a major portion of apertures 64 communicate with cavity 68. However, apertures 64 are also of sufficient length as to be partially embedded in plug section 46, so that the pressure of air flowing through inlet stem 34 assists and enhances the above-mentioned radial urging of plug material against the shell wall.

In assembly, shell 36 and cap 50 are separately formed, preferably of molded plastic construction. Plug sections 46,48 of desired porosity are then inserted into shell 36, and end cap 50 is placed in position and permanently secured over the shell opening. In the field, cartridge assembly 14 so formed is simply inserted into case 16 and cap 30 secured thereover. It will be noted that the axial length of shell wall 38 is selected such that shell end wall 40 is always spaced from case shoulder 28, given normal manufacturing tolerance variations. Thus, flange 50 is captured and compressed between case end wall 26 and cap 30 for sealing against air flow around the cartridge. In operation, incoming air is diffused by apertures 64 into cavity 68, which has an increased cross section to air flow so that air velocity decreases. Large particles will thus collect in cavity 68. The air is then directed through plug sections 46,48, for vaporization and further filtration as previously described, to outlet opening 20.

It will thus be appreciated that the presently preferred embodiment of the invention herein disclosed fully satisfies all of the objects and aims previously set forth. For example, the design of cartridge shell 36 and end cap 50, including specifically projection 62, is such as to insure proper sealing against air flow around plug material 46 and around the cartridge itself. Furthermore, the design accommodates normal manufacturing variations in the dimensions of the various elements without compromising the sealing functions. The cartridge assembly may be simply removed from the shipping container and placed within a housing by an operator in the field without preliminary operations. The use of knitted mesh allows the density and porosity of the plug material to be closely controlled.

The invention claimed is:

1. A disposable cartridge assembly adapted for replaceable insertion into a pneumatic liquid evaporator housing which includes a case having a cylindrical bore with a first fluid port at one axial end of said bore and an open second end remote from said first fluid port and surrounded by an axially outwardly facing end surface, and a cap including a second fluid port removably secured to said casing over said open end, said second fluid port being predesignated a fluid entrance port and the first being predesignated a fluid exit port, said disposable filter cartridge assembly comprising a hollow cylindrical shell having an imperforate side wall and an integral end wall with at least one opening extending axially therethrough, said shell side wall having a diameter and length adapted to be received within said bore such that said end wall is disposed adjacent to said first fluid port, a plug of water absorbent material disposed within said shell and extending across said shell so as to fill said shell within said side wall, and an end member received over and permanently affixed to an end of said shell remote from said end wall, said end member comprising a peripheral portion having a diameter greater than said diameter of said shell for axial abutting engagement with said end surface of said case and a central portion integral with said peripheral portion, said central portion having an opening extending axially therethrough and a hollow sleeve integrally surrounding said opening and projecting into said shell, said sleeve having a plurality of apertures extending radially therethrough for directing fluid radially into said shell, said plug of water absorbent material having an axial dimension which is less than said length of said shell, said sleeve having an end which engages said plug and holds said plug against said shell end wall, such that a portion of the interior of said shell immediately adjacent to said end member is open, said cartridge assembly, including said shell and said end member, being adapted to be inserted into said case only from a direction which places said shell end wall adjacent to said first fluid port and said end member adjacent to said cap with second fluid port.

2. The disposable cartridge assembly set forth in claim 16 wherein said sleeve includes a closed end which tapers narrowingly away from said central portion of said end member, said closed sleeve end being embedded in said plug for urging plug material radially outwardly against said shell side wall.

3. The disposable cartridge assembly set forth in claim 2 wherein a first portion of said apertures in said sleeve opens into said open interior, and a second portion of said apertures opens radially into that portion of said plug into which said closed end of said sleeve is embedded, such that fluid pressure urges said plug material radially outwardly against said shell side wall.

4. The disposable cartridge assembly set forth in claim 3 wherein said plug includes a first plug section having a first filter porosity disposed adjacent to said end member and engaged by said sleeve, and a second plug section having a second filter porosity less than said first porosity disposed adjacent to said shell end wall.

5. The disposable cartridge assembly set forth in claim 1 wherein said bore in said case has a predetermined axial dimension and terminates within said case in a shoulder, and wherein said length of said shell is sufficiently less than said predetermined axial dimension that normal manufacturing tolerance variations of said predetermined dimension and said length will not result in abutment of said shell end wall against said shoulder.

6. The disposable cartridge assembly set forth in claim 1 wherein said plug comprises a knitted mesh of metal fibers and fibers of water absorbent material.

7. A pneumatic liquid evaporator and filter comprising an elongated hollow shell having an imperforate side wall and an integral end wall with at least one through opening, an end cap received over an end of said shell remote from said end wall and permanently affixed thereto so as to form a cavity within said shell between said end wall and said end cap, said end cap comprising a peripheral portion sealingly affixed to said shell, a central portion with a through opening, and a hollow projection integrally surrounding said opening and projecting into said cavity, with a plurality of apertures being formed in said projection for admitting fluid into said cavity, and a plug of water absorbent material filling said cavity adjacent to said shell end wall and extending to adjacent said projection, said projection urging said plug against said end wall such that a portion of said cavity adjacent said end cap is open.

8. The pneumatic liquid evaporator and filter set forth in claim 7 wherein said projection includes a closed end which tapers narrowingly away from said central portion of said end member, said closed projection end being embedded in said plug for urging plug material radially outwardly against said shell side wall.

9. The pneumatic liquid evaporator and filter set forth in claim 8 wherein a first portion of said apertures in said projection opens into said open interior, and a second portion of said apertures opens radially into that portion of said plug into which said closed end of said projection is embedded, such that fluid pressure urges said plug material radially outwardly against said shell side wall.

10. The pneumatic liquid evaporator and filter set forth in claim 9 wherein said plug includes a first plug section having a first filter porosity disposed adjacent to said end member and engaged by said projection, and a second plug section having a second filter porosity less than said first porosity disposed adjacent to said shell end wall.

11. The pneumatic liquid evaporator and filter set forth in claim 9 wherein said apertures comprise a circumferential array of axial slots.

12. The pneumatic liquid evaporator and filter set forth in claim 7 wherein said plug comprises a knitted mesh of metal fibers and fibers of water absorbent material.

* * * * *